United States Patent
Suzuki et al.

(10) Patent No.: US 9,885,097 B2
(45) Date of Patent: Feb. 6, 2018

(54) ALUMINUM ALLOY SHEET FOR BATTERY CASE USE EXCELLENT IN FORMABILITY, HEAT DISSIPATION, AND WELDABILITY

(71) Applicant: NIPPON LIGHT METAL COMPANY, LTD., Shinagawa-ku, Tokyo (JP)

(72) Inventors: Kenta Suzuki, Shizuoka (JP); Yasuyuki Oowada, Shizuoka (JP); Hisashi Hori, Shizuoka (JP); Kazumitsu Mizushima, Inazawa (JP)

(73) Assignee: NIPPON LIGHT METAL COMPANY, LTD. (JP)

( * ) Notice: Subject to any disclaimer, the term of this patent is extended or adjusted under 35 U.S.C. 154(b) by 408 days.

(21) Appl. No.: 14/404,313

(22) PCT Filed: May 23, 2013

(86) PCT No.: PCT/JP2013/064385
§ 371 (c)(1),
(2) Date: Nov. 26, 2014

(87) PCT Pub. No.: WO2014/057707
PCT Pub. Date: Apr. 17, 2014

(65) Prior Publication Data
US 2015/0167126 A1    Jun. 18, 2015

(30) Foreign Application Priority Data
Oct. 12, 2012  (JP) .................................. 2012-226968

(51) Int. Cl.
C22C 21/02    (2006.01)
C22F 1/043    (2006.01)
(Continued)

(52) U.S. Cl.
CPC .......... *C22C 21/00* (2013.01); *B23K 35/0233* (2013.01); *B23K 35/286* (2013.01);
(Continued)

(58) Field of Classification Search
CPC ............ C22C 21/00–21/18; C22F 1/04–1/186
See application file for complete search history.

(56) References Cited

U.S. PATENT DOCUMENTS

2005/0019204 A1    1/2005   Haller et al.

FOREIGN PATENT DOCUMENTS

| CN | 1578844 A | 2/2005 |
| CN | 102453819 A | 5/2012 |

(Continued)

OTHER PUBLICATIONS

"Properties of Wrought Aluminum and Aluminum Alloys, Properties and Selection: Nonferrous Alloys and Special-Purpose Materials", vol. 2, ASM Handbook, ASM International, 1990, p. 62-122.*
(Continued)

*Primary Examiner* — Lois Zheng
(74) *Attorney, Agent, or Firm* — Merchant & Gould P.C.

(57) ABSTRACT

An aluminum alloy sheet having a heat dissipation characteristic that is applicable to a large-size lithium ion battery container, excellent in formability and shape freezability and excellent in laser weldability is provided. An aluminum alloy sheet comprising a cold rolled, annealed material containing Fe: 0.05 to less than 0.3 mass %, Mn: 0.6 to 1.5 mass %, and Si: 0.05 to 0.6 mass %, has a balance of Al and impurities Cu: less than 0.35 mass % and Mg: less than 0.05 mass %, has a conductivity exceeding 45% IACS, has a 0.2% proof strength of 40 to less than 60 MPa, and displays a 20% or more value of elongation is also provided. An aluminum alloy sheet comprising an as-cold-rolled material having a conductivity exceeding 45% IACS, a 0.2% proof
(Continued)

strength of 60 to less than 150 MPa, and displaying 3% or more value of elongation is also provided.

2 Claims, 1 Drawing Sheet

(51) Int. Cl.

| | | |
|---|---|---|
| *C22C 21/00* | (2006.01) | |
| *C22F 1/04* | (2006.01) | |
| *B23K 35/28* | (2006.01) | |
| *B23K 35/02* | (2006.01) | |
| *H01M 2/02* | (2006.01) | |
| *H01M 2/00* | (2006.01) | |

(52) U.S. Cl.
CPC ............... *C22F 1/04* (2013.01); *H01M 2/026* (2013.01); *H01M 2/0257* (2013.01); *H01M 2/0262* (2013.01); *H01M 2/0285* (2013.01); *H01M 2002/0297* (2013.01)

(56) References Cited

FOREIGN PATENT DOCUMENTS

| CN | 102628129 A | 8/2012 |
|---|---|---|
| CN | 102925758 | 2/2013 |
| JP | 08-329908 A | 12/1996 |
| JP | 11-007922 A | 1/1999 |
| JP | H11-7922 A | 1/1999 |
| JP | 11-214856 A | 8/1999 |
| JP | 11-350057 A | 12/1999 |
| JP | 2000-273593 A | 10/2000 |
| JP | 2000-328166 | 11/2000 |
| JP | 2000-328166 A | 11/2000 |
| JP | 2002-134069 A | 5/2002 |
| JP | 2002-134069 A | 5/2002 |
| JP | 2002-339049 | 11/2002 |
| JP | 2003-003226 A | 1/2003 |
| JP | 3620955 B | 11/2004 |
| JP | 3763088 | 1/2006 |
| JP | 2009-256754 A | 11/2009 |
| JP | 2012-197489 | 10/2012 |
| WO | WO 2012/105143 A1 | 8/2012 |
| WO | WO 2012/105144 A1 | 8/2012 |

OTHER PUBLICATIONS

Engineering Division Handbook, Aluminum City (Pty) Limited, pp. T1-113, R1-R2, E1-E5 (Sep. 1999).
"Conductivity and Resistivity Values for Aluminum and Alloys," Collaboration for NDT Education (Mar. 2002).
International Search Report for corresponding International Patent Application No. PCT/JP2013/064385 with English translation (dated Jul. 9, 2013).
Edited by Japan Aluminum Association, Aluminum Handbook (7$^{th}$ edition), Japan Aluminum Association, Jan. 31, 2007.
Aluminum Kako Gijutsu Binran Henshu Iinkai, Aluminum Kako Gijutsu Binran, *The Nikkan Kogyo Shinbun, Ltd.* (Mar. 5, 1970).
European Search Report for EP Application No. 13844640.6 (dated Feb. 22, 2016).
"3003 (AlMn1Cu, 3.0517, A93003) Aluminum." makeitfrom.com, at http://www.makeitfrom.com/material-properties/3003 AlMn (Dec. 31, 2009).

\* cited by examiner

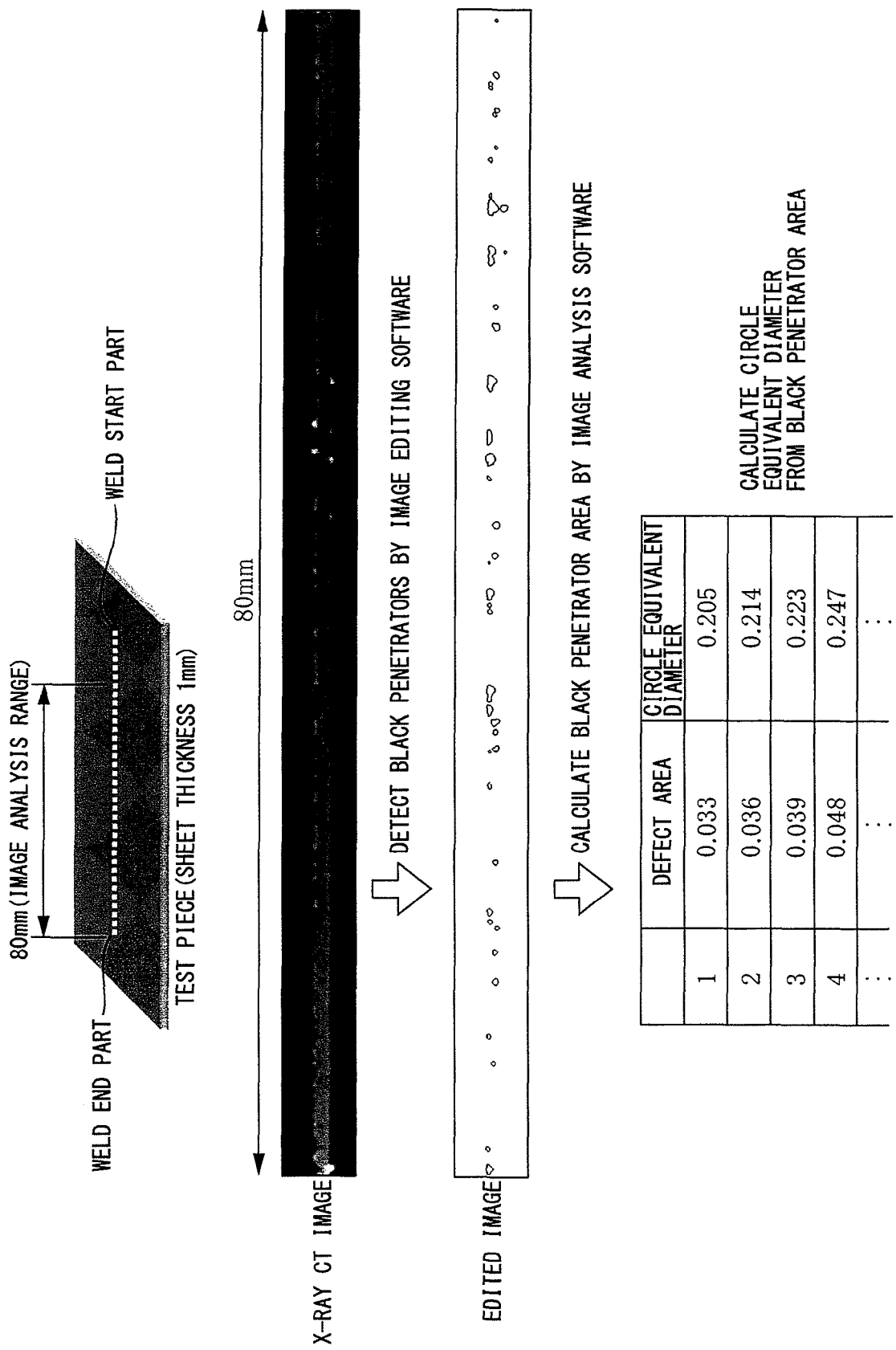

_US 9,885,097 B2_

ALUMINUM ALLOY SHEET FOR BATTERY CASE USE EXCELLENT IN FORMABILITY, HEAT DISSIPATION, AND WELDABILITY

This appplication is a U.S. National Stage Application under 35 U.S.C. § 371 of International Patent Application No. PCT/JP2013/064385 filed 23 May 2013, which claims the benefit of priority to Japanese Patent Application No. 2012-226968 filed 12 Oct. 2012 the dislosures of all of which are hereby incorporated by reference in their entireties. The International Application was published in Japanese on 17 Apr. 2014 as WO 2014/057707.

TECHNICAL FIELD

The present invention relates to aluminum alloy sheet which is excellent in formability, heat dissipation, and weldability for use for a container for a lithium ion battery or other secondary battery.

BACKGROUND ART

Al—Mn-based 3000 series alloys are relatively excellent in strength, formability, and laser weldability, so are used as materials when producing containers for lithium ion batteries and other secondary batteries. They are formed into the desired shapes, then are laser welded to seal them tight for use as containers for secondary batteries. Along with the 3000 series alloys, aluminum alloy sheets for secondary battery container use which are based on existing 3000 series alloys but are further increased in strength and formability have been developed.

For example, PLT 1 describes aluminum alloy sheet for a box shaped battery case characterized by having as the composition of the aluminum alloy sheet the composition which is prescribed in JIS A3003, having an earring ratio of 8% or less, having an average particle size of recrystallized crystal grains of 50 μm or less, and having an electrical conductivity of 45 IACS % or less.

On the other hand, as a battery case, an aluminum alloy sheet for a battery case which is excellent in swelling resistance at the time of a high temperature, internal pressure load has been developed. PLT 2 describes an aluminum alloy sheet for a battery case which is excellent in swelling resistance at the time of a high temperature, internal pressure load characterized by containing Mn: 0.8 to 2.0% (wt %, same below), being restricted in impurity elements to Si: 0.04 to 0.2% and Fe: 0.04 to 0.6%, having a balance of Al and unavoidable impurities, having an amount of Mn in solid solution of 0.25% or more, having a proof strength value of 150 to 220N/mm² in range, and having an average area of crystal particle size at a cross-section parallel to the rolling direction of 500 to 8000 μm² in range.

However, in an aluminum alloy sheet based on a 3000 series alloy which has been improved in composition, sometimes an abnormal bead is formed. It is known that there is a problem in laser weldability. Therefore, an aluminum alloy sheet improved in laser weldability for secondary battery container use which is based on the 1000 series is also being developed. PLT 3 describes an aluminum alloy sheet which is excellent in laser weldability which is free of uneven bead when laser welding an A1000-based aluminum material. According to this, in the aluminum alloy sheet, it is sufficient to include Si: 0.02 to 0.10 mass %, restrict the Fe content to 0.30 mass % or less, include a balance of Al and unavoidable impurities, and restrict the number of intermetallic compound particles with a circle equivalent diameter of 1.5 to 6.5 μm to 1000 to 2400/mm².

CITATION LIST

Patent Literature

PLT 1: Japanese Patent No. 3620955
PLT 2: Japanese Patent No. 3763088
PLT 3: Japanese Patent Publication No. 2009-256754A

SUMMARY OF INVENTION

Technical Problem

Indeed, in the 1000 series, there is the problem that while the weldability is stable and the formability is excellent, the strength is low. Therefore, with lithium ion batteries becoming increasingly larger in size, it is expected that high strength characteristics will also become demanded and there will be a problem with application of 1000 series aluminum materials as they are.

As explained above, in 3000-series alloy sheets, strength and swelling resistance at the time of a high temperature, internal pressure load are obtained, the formability is inferior compared with 1000 series alloy sheets, and the number of abnormal beads tends to become greater. Further, with lithium ion batteries becoming increasingly larger in size, it is anticipated that the amount of heat which is generated from lithium ion batteries at the time of charging and discharging will increase and excellent heat dissipation characteristics will also be demanded. Further, 3000 series aluminum alloy sheets are generally high in amount of Mn in solid solution. Sometimes, while depending on the chemical composition, the proof strength becomes too high for a large-size lithium ion battery container. There is also a problem with the ease of occurrence of springback after press forming and the inability to realize a predetermined design shape, that is, the so-called shape freezability.

The present invention was created to solve such a problem and has as its object the provision of 3000 series aluminum alloy sheet which has a heat dissipation characteristic which enables application to a large-size lithium ion battery container and further is excellent in formability and shape freezability and excellent in laser weldability.

Solution to Problem

The aluminum alloy sheet for battery container use which is excellent in formability and weldability of the present invention achieves this objective by containing Fe: 0.05 to less than 0.3 mass %, Mn: 0.6 to 1.5 mass %, and Si: 0.05 to 0.6 mass %, having a balance of Al and impurities, having, as impurities, Cu: less than 0.35 mass % and Mg: less than 0.05 mass % in chemical composition and having an electrical conductivity of over 45% IACS.

When made into a cold rolled, annealed material, the 0.2% proof strength is 40 to less than 60 MPa and a 20% or more elongation value is displayed. Further, when an as-cold-rolled material, the 0.2% proof strength is 60 to less than 150 MPa and a 3% or more of elongation value is exhibited.

Furthermore, to raise the electrical conductivity, one or more of Co: 0.001 to 0.5 mass %, Nb: 0.005 to 0.05 mass %, and V: 0.005 to 0.05 mass % may be further contained.

Advantageous Effects of Invention

The aluminum alloy sheet of the present invention has a high heat conductivity and is excellent in formability as well and further is provided with excellent laser weldability, so it is possible to produce at a low cost a container for secondary battery use which is excellent in sealing performance and improved in heat dissipation characteristic.

In particular, a cold rolled, annealed material displays a 20% or more elongation value and exhibits excellent formability and also has a proof strength of a low 40 to less than 60 MPa, so the springback at the time of press forming is suppressed and as a result the shape freezability is also excellent.

Further, an as-cold-rolled material displays a 3% or more elongation value and exhibits excellent formability and also has a proof strength of a low 60 to less than 150 MPa, so springback at the time of press formation is suppressed and as a result the shape freezability is also excellent.

BRIEF DESCRIPTION OF DRAWINGS

FIG. 1 is a conceptual view which explains the method of measurement/evaluation of the number of weld defects.

DESCRIPTION OF EMBODIMENTS

A secondary battery is produced by placing electrode members in a container, then attaching a lid by welding etc. to seal it. If using such a secondary battery for a mobile phone etc., at the time of charging, the temperature at the inside of the container sometimes rises. For this reason, there is the problem that if the material which the container is made of is low in heat conductivity, the heat dissipation characteristic will become inferior which, in turn, will lead to a shorter lifetime of the lithium ion battery. Therefore, as the material which is used, one which has a high heat conductivity is sought.

Further, use of pressing as the method for forming the container is the general practice, so the material used itself is required to have excellent press formability. Furthermore, in a large-size lithium ion battery container as well, it is expected that in the future, reduction in thickness of the material will be spurred on. Of course, if the material becomes thinner, there is the possibility of the problem surfacing of springback easily occurring after press forming and a predetermined design shape not being realized. Therefore, the material used itself is required to have excellent shape freezability.

Further, since the welding method is used as the method of attaching and sealing the lid, excellent weldability is also demanded. Further, as the welding method when producing a container for secondary battery use etc., the laser welding method is usually used.

As explained above, in a 3000 series sheet material, in general, to impart swelling resistance, the amount of Mn in solid solution is increased to raise the proof strength. While the swelling resistance at the time of a high temperature, internal pressure load can be sufficiently secured, there is the problem that the material is inferior in heat conductivity and inferior in heat dissipation characteristic of the container.

Therefore, in the present invention, by setting the starting temperature for hot rolling the slab lower than the homogenization treatment temperature to intentionally make the Mn and Si which form solid solutions in the matrix be diffused and absorbed in the intermetallic compounds and reduce the amount of Mn in solid solution and the amount of Si in solid solution, the heat conductivity of the final sheet is raised and simultaneously the elongation value is raised and the proof strength is kept low. As a result, it is possible to obtain an aluminum alloy sheet which has a high heat dissipation characteristic and which is excellent in formability and shape freezability as well.

Therefore, the 3000 series aluminum alloy sheet according to the present invention has a high heat conductivity, so when bonding the container which is obtained by press forming and the lid by a pulse laser, it is necessary to raise the energy per pulse etc. to perform bonding under more severe conditions. However, if performing laser welding under relatively severe conditions in this way, there is the problem that the weld bead will be undercut and weld defects called "blow holes" will occur.

By firing such a pulse laser, it is guessed that the surface temperature of the weld bead being joined will locally reach a 2000° C. or more high temperature. Aluminum is considered a high reflectance material and is considered to reflect about 70% of a laser beam. On the other hand, the second phase particles which are present near the surface of the aluminum alloy sheet, for example, the $\alpha$-Al—(Fe.Mn)—Si or other intermetallic compounds, have a smaller specific heat and heat conductivity compared with the aluminum of the matrix even at room temperature and rise in temperature in advance. The heat conductivities of these intermetallic compounds become further lower along with a rise in temperature. The light absorption rate rises in an accelerated manner whereby only the intermetallic compounds are rapidly heated and melted. The firing time of one pulse of the pulse laser is nanoseconds or femtoseconds or another extremely short time. Therefore, around the time that the matrix $\alpha$-Al melts and transitions to a liquid phase, the $\alpha$-Al—(Fe.Mn)—Si or other intermetallic compounds first reach the boiling point and evaporate, whereby the volume is made to rapidly expand.

Therefore, in the present invention, the contents of Fe, Mn, and Si are prescribed, the contents of the impurities of Cu and Mg are kept low, and the homogenization treatment temperature of the slab is set to a relatively high temperature so as to promote the formation of solid solutions of the transition elements to a certain extent and reduce the number of weld defects which occur at the laser weld zone. The inventors engaged in investigations of the characteristics relating to heat conductivity (electrical conductivity) and press formability and investigations of the number of weld defects which occur at the weld zone so as to study in depth how to obtain an aluminum alloy sheet which is excellent in laser weldability and thereby reached the present invention.

Below, the contents will be explained.

First, the actions, suitable contents, etc. of the elements which are contained in the aluminum alloy sheet for secondary battery container use of the present invention will be explained.

Fe: 0.05 to less than 0.3 Mass %

Fe is an essential element for increasing the strength of the aluminum alloy sheet. If the Fe content is less than 0.05 mass %, the aluminum alloy sheet falls in strength, so this is not preferable. If the Fe content is over 0.3 mass %, at the time of casting a cast ingot, $\alpha$-Al—(Fe.Mn)—Si-based, $Al_6$(Fe.Mn)-based, or other rough intermetallic compounds precipitate. These intermetallic compounds vaporize more easily at the time of laser welding compared with the Al matrix. The number of weld defects increases and the weldability falls, so this is not preferable.

Therefore, the Fe content is 0.05 to less than 0.3 mass % in range. The more preferable Fe content is 0.07 to less than 0.3 mass % in range. The still more preferable Fe content is 0.1 to less than 0.3 mass % in range.

Mn: 0.6 to 1.5 Mass %

Mn is an essential element for increasing the strength of aluminum alloy sheet. If the Mn content is less than 0.6 mass %, the aluminum alloy sheet falls in strength, so this is not preferable. If the content of Mn exceeds 1.5 mass %, the amount of Mn forming a solid solution in the matrix becomes too high so not only does the final sheet fall in heat conductivity, but also the proof strength becomes too high and the shape freezability also falls. Furthermore, at the time of casting a cast ingot, α-Al—(Fe.Mn)—Si-based, $Al_6$(Fe.Mn)-based, or other rough intermetallic compounds precipitate. These intermetallic compounds vaporize more easily at the time of laser welding compared with Al matrix, so the number of weld defects increases and the weldability falls, so this is not preferable.

Therefore, the Mn content is 0.6 to 1.5 mass % in range. The more preferable Mn content is 0.6 to 1.4 mass % in range. The still more preferable Mn content is 0.6 to 1.3 mass % in range.

Si: 0.05 to 0.6 Mass %

Si is an essential element for increasing the strength of aluminum alloy sheet and improving the melt flow at the time of casting. If the Si content is less than 0.05 mass %, the aluminum alloy sheet falls in strength and the melt flow falls, so this is not preferable. If the content of Si exceeds 0.6 mass %, at the time of casting a cast ingot, relatively rough α-Al—(Fe.Mn)—Si-based or other intermetallic compounds precipitate. These intermetallic compounds vaporize more easily at the time of laser welding compared with the Al matrix, so the number of weld defects increases and the weldability falls, so this is not preferable.

Therefore, the preferable Si content is 0.05 mass % to 0.6 mass % in range. The more preferable Si content is 0.07 mass % to 0.6 mass % in range. The still more preferable Si content is 0.07 mass % to 0.55 mass % in range.

Co: 0.001 to 0.5 Mass %

Co has the effect of raising the electrical conductivity of the final sheet and further of also raising the elongation value in the range of alloy composition of the present invention. Regarding the advantageous effect when including Co: 0.001 to 0.5 mass %, it is unclear at the present by what kind of mechanism this is manifested. The inventors guess that, in the range of alloy composition of the present invention, if including Co: 0.001 to 0.5 mass %, in the homogenization treatment or in the furnace cooling process after the homogenization treatment, $Al_6$(Fe.Mn) precipitates more uniformly in the matrix.

If the Co content is less than 0.001 mass %, the above-mentioned such advantageous effects are not expressed. If the Co content is over 0.5 mass %, the manufacturing cost just increases, so this is not preferable. Therefore, the preferable Co content is 0.001 to 0.5 mass % in range. The more preferable Co content is 0.001 to 0.3 mass % in range. The still more preferable Co content is 0.001 to 0.1 mass % in range.

Nb: 0.005 to 0.05 Mass %

Nb has the effect of raising the electrical conductivity of the final sheet and further also raising the elongation value in the range of alloy composition of the present invention. Regarding the advantageous effect when including Nb: 0.005 to 0.05 mass % as well, it is unclear at the present by what kind of mechanism this is manifested. The inventors guess that, in the range of alloy composition of the present invention, if including Nb: 0.005 to 0.05 mass %, in the homogenization treatment or in the furnace cooling process after the homogenization treatment, $Al_6$(Fe.Mn) precipitates more uniformly in the matrix.

If the Nb content is less than 0.005 mass %, the above-mentioned such advantageous effects are not expressed while if the Nb content is over 0.05 mass %, the manufacturing cost just increases, so this is not preferable. Therefore, the preferable Nb content is 0.005 to 0.05 mass % in range. The more preferable Nb content is 0.007 to 0.05 mass % in range. The still more preferable Nb content is 0.01 to 0.05 mass % in range.

V: 0.005 to 0.05 Mass %

V has the effect of raising the electrical conductivity of the final sheet in the range of alloy composition of the present invention. Regarding the advantageous effect when including V: 0.005 to 0.05 mass % as well, it is unclear at the present by what kind of mechanism this is manifested. The inventors guess that, in the range of alloy composition of the present invention, if including V: 0.005 to 0.05 mass %, in the homogenization treatment or in the furnace cooling process after the homogenization treatment, $Al_6$(Fe.Mn) precipitates more uniformly in the matrix.

If the V content is less than 0.005 mass %, the above-mentioned such advantageous effects are not expressed. If the V content is over 0.05 mass %, conversely the conductivity falls, so this is not preferable. Therefore, the preferable V content is 0.005 to 0.05 mass % in range. The more preferable V content is 0.005 to 0.03 mass % in range. The still more preferable V content is 0.01 to 0.03 mass % in range.

Cu as Unavoidable Impurity: less than 0.35 Mass %

Cu may be contained as an unavoidable impurity in less than 0.35 mass %. In the present invention, if the Cu content is less than 0.35 mass %, the heat conductivity, formability, weldability, and other characteristics will not fall. If the Cu content is 0.35 mass % or more, the heat conductivity will fall, so this is not preferable.

Mg as Unavoidable Impurities: less than 0.05 Mass %

Mg may be contained as an unavoidable impurity in less than 0.05 mass %. In the present invention, if the Mg content is less than 0.05 mass %, the heat conductivity, formability, weldability, and other characteristics will not fall.

Other Unavoidable Impurities

Unavoidable impurities unavoidably enter from the starting material metals, recycled materials, etc. Their allowable contents are, for example, Zn: less than 0.05 mass %, Ni: less than 0.10 mass %, Pb, Bi, Sn, Na, Ca, and Sr: respectively less than 0.02 mass %, Ga and Ti: less than 0.01 mass %, Nb and V: less than 0.005 mass %, Co: less than 0.001 mass %, others: each less than 0.05 mass %. Even if unmanaged elements are contained in this range, the effects of the present invention are not impaired.

Elongation Value and 0.2% Proof Strength

Cold Rolled, Annealed Material: Value of Elongation of 20% or more and 0.2% Proof Strength of 40 to less than 60 MPa As-cold-rolled Material: Value of Elongation of 3% or more and 0.2% Proof Strength of 60 to less than 150 MPa In this regard, in applying 3000 series aluminum alloy sheet to a large-size lithium ion battery container etc., it is necessary to not only have a high heat dissipation characteristic and excellent laser weldability, but also maintain suitable strength while being excellent in formability and shape freezability as well. The shape freezability and strength of a material can be learned by the 0.2% proof strength at the time of performing a tensile test, while the formability can be learned by the value of elongation at the time of a tensile test.

Details will be left to the later description of the examples, but as the 3000 series aluminum alloy sheet of the present invention which is applied to a large-size lithium ion battery container etc., a cold rolled, annealed material which has the characteristics of a value of elongation of 20% or more and a 0.2% proof strength of 40 to less than 60 MPa and an as-cold-rolled material which has the characteristics of a value of elongation of 3% or more and a 0.2% proof strength of 60 to less than 150 MPa are preferable.

Electrical Conductivity over 45% IACS

The above-stated characteristics are realized when producing the 3000 series aluminum alloy sheet which has a specific chemical composition by setting the rolling start temperature lower than the homogenization treatment temperature and thereby reduce the amount of Mn in solid solution and the amount of Si in solid solution in the matrix.

Specifically, for example, it is possible to insert the slab in a soaking furnace, heat it and hold it at 600° C.×1 hour or more as homogenization treatment, then furnace cool it until a predetermined temperature, for example, 500° C., then take out the slab from the soaking furnace at that temperature and start hot rolling. Further, it is possible to insert the slab in a soaking furnace, heat it and hold it at 600° C.×1 hour or more as homogenization treatment, then cool it in the soaking furnace until a predetermined temperature, for example, 500° C., and after that hold it 500° C.×1 hour or more for a second stage homogenization treatment, then take out the slab from the soaking furnace and start hot rolling.

By performing the slab homogenization treatment at a 520 to 620° C. holding temperature for 1 hour or more in holding time and setting the starting temperature of the hot rolling to less than 520° C. in this way, it becomes possible to reduce the amount of Mn in solid solution and the amount of Si in solid solution in the matrix.

If the starting temperature for the hot rolling is less than 420° C., the roll pressure which is required for plastic deformation at the time of hot rolling becomes high and the rolling reduction per pass becomes too low, so the productivity falls, so this is not preferable. Therefore, the preferable starting temperature for the hot rolling is 420 to less than 520° C. in range.

In the furnace cooling process after the homogenization treatment (including second stage homogenization treatment), at the high temperature side, the $Al_6(Fe.Mn)$ precipitates absorb the Mn in solid solution in the matrix increasing in size, while at the low temperature side, the $Al_6(Fe.Mn)$ precipitates absorb the Mn and Si in solid solution in the matrix transforming to the $\alpha$-Al—(Fe.Mn)—Si by diffusion.

The present inventors surmised that in the range of alloy composition of the present invention, if including Co, Nb, or V in predetermined amounts, in the homogenization treatment or the furnace cooling process after the homogenization treatment, $Al_6(Fe.Mn)$ would precipitate more finely. In such a case, the number of sites where the Mn and Si which formed solid solutions in the matrix would be diffused and absorbed would increase, so it would become possible to more efficiently lower the amounts of solid solution of the Mn and Si in the matrix and raise the electrical conductivity.

On the other hand, at the time of casting the 3000 series alloy, in particular at locations like the final solidified parts, while also depending on the chemical composition, relatively rough $Al_6(Fe.Mn)$, $\alpha$-Al—(Fe.Mn)—Si, and other intermetallic compounds precipitate. These relatively rough intermetallic compounds vaporize more easily than the Al matrix at the time of laser welding of the final sheet and are believed to become a cause of increase in the number of weld defects. However, even if making the melt of the range of composition of the present invention contain Co, Nb, or V in predetermined amounts, no effect of remarkably reducing the number of weld defects at the laser welding zone could be confirmed. Therefore, even if making the melt of the range of composition of the present invention contain Co, Nb, or V in predetermined amounts, it is guessed that there is no effect on the form of precipitation of the relatively rough $Al_6(Fe.Mn)$, $\alpha$-Al—(Fe.Mn)—Si, or other intermetallic compounds.

Next, the method of producing the above-mentioned aluminum alloy sheet for secondary battery container use will be simply introduced.

Melting and Refining

The starting materials are charged into the melting furnace. After reaching a predetermined melting temperature, flux is suitably charged and stirred in and further, in accordance with need, a lance etc. is used to perform in-furnace degassing, then the melt is held to allow it to settle and slag is separated from the melt surface.

In this melting and refining, to obtain predetermined alloy ingredients, it is important to again charge the master alloy and other starting materials, but it is extremely important to secure a sufficient settling time until the flux and slag floats up from the aluminum alloy melt to the melt surface for separation. The settling time is preferably usually 30 minutes or more.

The aluminum alloy melt which is melted in the melting furnace sometimes is cast after once being transferred to a holding furnace, but sometimes is also directly tapped from the melting furnace and cast. The more preferable settling time is 45 minutes or more.

In accordance with need, it is also possible to run the melt through an inline degassing and filter process.

The inline degassing is mainly of a type which blows an inert gas etc. from a rotary rotor into the aluminum melt to cause the hydrogen gas in the melt to diffuse in the bubbles of the inert gas for removal. When using inert gas constituted by nitrogen gas, it is important to manage the dew point to, for example, −60° C. or less. The amount of hydrogen gas of the cast ingot is preferably reduced to 0.20 cc/100 g or less.

If the amount of hydrogen gas of the cast ingot is large, porosity occurs in the final solidified parts of the cast ingot, so the rolling reduction per pass at the hot rolling step has to be restricted to, for example, 7% or more to crush the pores.

Further, the hydrogen gas which forms a solid solution in the cast ingot in a supersaturated state, while depending on the conditions of the homogenization treatment before the hot rolling step, sometimes precipitates at the time of laser welding after shaping the final sheet and causes the formation of a large number of blow holes at the bead. For this reason, the more preferable amount of hydrogen gas of the cast ingot is 0.15 cc/100 g or less.

Casting

The cast ingot is produced by semicontinuous casting (DC casting). In the case of normal semicontinuous casting, the thickness of the cast ingot is generally 400 to 600 mm or so, so the solidification cooling rate at the center part of the cast ingot is about 1° C./sec. For this reason, in particular, when casting an aluminum alloy melt with high contents of Fe, Mn, and Si by semicontinuous casting, $Al_6(Fe.Mn)$, $\alpha$-Al—(Fe.Mn)—Si, and other relatively rough intermetallic compounds tend to precipitate from the aluminum alloy melt at the center part of the cast ingot.

The casting speed at the time of semicontinuous casting depends on the width and thickness of the cast ingot, but usually, considering also the productivity, is 50 to 70 mm/min. However, when performing inline degassing, if considering the actual melt residence time in the degassing treatment tank, while depending also on the flow rate of the inert gas and other degassing conditions, the smaller the flow rate of the aluminum melt (feed rate of melt per unit time), the better the degassing efficiency in the tank and the more the amount of hydrogen gas in the cast ingot can be reduced. While depending also on the number of pouring operations during casting, to reduce the amount of hydrogen gas in the cast ingot, it is desirable to restrict the casting speed to 30 to 50 mm/min. The more desirable casting speed is 30 to 40 mm/min. Of course, if the casting rate is less than 30 mm/min, the productivity falls, so this is not desirable. Note that, the slower the casting speed, the gentler the slant of the sump (interface of solid phase/liquid phase) at the cast ingot and the more possible it is to prevent casting cracks needless to say.

Homogenization Treatment: 520 to 620° C.×1 Hour or more

The cast ingot which is obtained by casting by the semicontinuous casting method is treated for homogenization.

The homogenization treatment is treatment which facilitates rolling by holding the cast ingot at a high temperature and eliminating casting segregation and residual stress inside the cast ingot. In the present invention, it is necessary to hold the ingot at the holding temperature of 520 to 620° C. for 1 hour or more. In this case, this is also treatment for making the transition elements etc. which form the intermetallic compounds which are precipitated at the time of casting form solid solutions in the matrix to a certain extent. If this holding temperature is too low or the holding temperature is short, the above formation of a solid solution will not proceed and the outer skin after drawing and ironing is liable not to be beautifully finished. Further, if the holding temperature is too high, the final solidified parts, that is, eutectic parts, of the cast ingot are liable to melt, that is, burning is liable to occur. The more preferable homogenization treatment temperature is 520 to 610° C.

Starting Temperature of Hot Rolling: 420 to less than 520° C.

By performing the slab homogenization treatment at a 520 to 620° C. holding temperature for a 1 hour or more holding time and setting the starting temperature of the hot rolling to less than 520° C. in this way, it becomes possible to reduce the amounts of Mn and Si which form solid solutions in the matrix. If the starting temperature for the hot rolling exceeds 520° C., it becomes difficult to reduce the amounts of Mn and Si which form solid solutions in the matrix. If the starting temperature for the hot rolling is less than 420° C., the roll pressure which is necessary for the plastic deformation at the time of hot rolling becomes high and the rolling reduction per pass becomes too low and the productivity falls, so this is not preferable. Therefore, the preferable starting temperature for the hot rolling is 420 to less to 520° C. in range. The slab which is taken out from the soaking furnace is suspended as is by a crane and carried over to a hot rolling mill. While depending on the type of the hot rolling mill, usually several rolling passes are used for hot rolling to obtain a predetermined thickness, for example, 4 to 8 mm or so of a hot rolled sheet which is then wound up into a coil.

Cold Rolling Step

The coil of the hot rolled sheet which was wound up is passed through a cold rolling mill and usually cold rolled by several passes. At this time, the plastic strain which is introduced by the cold rolling causes work hardening to occur, so if necessary, process annealing treatment is performed. Normal process annealing is also softening treatment, so while depending on the material, it is also possible to insert the cold rolled coil into a batch furnace and hold it at 300 to 450° C. in temperature for 1 hour or more. If the holding temperature is lower than 300° C., the softening is not promoted. If the holding temperature exceeds 450° C., an increase in the treatment costs is induced. Further, the process annealing can also serve as solution treatment if using a continuous annealing furnace to hold the sheet at, for example, 450° C. to 550° C. in temperature for 15 seconds or less and then rapidly cooling. If the holding temperature is lower than 450° C., softening is not promoted, while if the holding temperature exceeds 550° C., burning is liable to occur.

Final Annealing

In the present invention, the final annealing which is performed after the final cold rolling may, for example, be batch processing which uses an annealing furnace to hold the material at a temperature of 350 to 500° C. for 1 hour, but if using a continuous annealing furnace to hold the material at, for example, 400° C. to 550° C. in temperature for within 15 seconds, then rapidly cool it, it is also possible have this serve simultaneously as the solution treatment.

Whatever the case, in the present invention, final annealing is not necessarily essential, but if considering the formability at the usual drawing and ironing, it is preferable to soften the final sheet as much as possible. If considering the formability at the die-forming step, it is desirable to make the sheet an annealed material or a solution treated material.

When giving priority to mechanical strength over formability, the sheet is provided as an as-cold-rolled material.

Final Cold Rolling Reduction

The final cold rolling reduction when performing the final annealing is preferably 50 to 90% in range. If the final cold rolling reduction is in this range, the average particle size of the recrystallized crystal grains at the final sheet after annealing can be made 20 to 100 μm to make the value of elongation 20% or more and the outer skin after shaping can be finished beautifully. The still more preferable final cold rolling reduction is 60 to 90% in range.

On the other hand, the final cold rolling reduction when not performing the final annealing and leaving the material as an as-cold-rolled material is preferably 5 to 20% in range. When ironing becomes greater at the time of drawing and ironing, it is necessary to provide a final sheet which is somewhat harder than the annealed material. If the final cold rolling reduction is less than 5%, while depending on the composition, it becomes difficult to make the proof strength at the final sheet 60 MPa or more. If the final cold rolling reduction exceeds 20%, while depending on the composition, it becomes difficult to make the value of elongation at the final sheet 3% or more.

If the final cold rolling reduction is in this range, it is possible to make the value of elongation at the final sheet as cold rolled 3% or more and making the proof strength 60 to less than 150 MPa. The more preferable final cold rolling reduction is 5 to 15% in range.

By going through the above such ordinary steps, it is possible to obtain aluminum alloy sheet for secondary battery container use.

EXAMPLES

Preparation of Final Sheet

Predetermined ingots of each type were weighed and mixed so that 6 kg each (total eight test materials) of ingots were inserted into #20 crucibles coated with mold release materials. These crucibles were inserted into an electrical furnace where the contents were melted at 780° C., the slag was removed, the melt was held at a temperature of 760° C., then 6 g each of deslagging flux was wrapped in aluminum foil and added by pushing it in by a phosphorizer.

Next, a lance was inserted into each melt and $N_2$ gas was blown in by a flow rate of 1.0 liter/min for 10 minutes for degassing treatment. After that, the melt was allowed to stand for 30 minutes and the slag which floated to the melt surface was removed by a stirring rod and, furthermore, a spoon was used to obtain a disk sample in a casting mold for chemical analysis.

Next, a fixture was used to successively take out the crucibles from the electric furnace and the aluminum melts were poured into preheated molds (250 mm×200 mm×30 mm). Disk samples of the test materials were analyzed for composition by optical emission spectrometry. The results are shown in Tables 1 and 2.

Each cast ingot was cut to remove the risers, then was shaved 2 mm each at its two surfaces to obtain a thickness of 26 mm.

The cast ingot was inserted into an electrical heating furnace and heated by a 100° C./hr temperature elevation rate until 600° C., was held at 600° C.×1 hour for homogenization treatment, then was taken out from the heating furnace and hot rolled by a hot rolling mill until a 6 mm thickness or was held at 600° C.×1 hour for homogenization treatment, then was cooled in-furnace as is after turning off the output of the electrical heating furnace and, when reaching a predetermined temperature (550° C., 500° C., 450° C.), was taken out from the heating furnace and hot rolled by a hot rolling mill to 6 mm thickness.

The hot rolled sheet was cold rolled to obtain a thickness 1.25 mm or 1.11 mm cold rolled sheet. The cold rolled sheet was inserted into an annealer and held at 400° C.×1 hour for process annealing, then the annealed sheet was taken out from the annealer and air cooled. Next, the annealed sheet

TABLE 1

Chemical Composition of Test Materials (Examples)

| Test | Chemical composition (mass %) | | | | | | | | |
|---|---|---|---|---|---|---|---|---|---|
| | Si | Fe | Cu | Mn | Mg | Zn | Co | Nb | V |
| Ex. 1 | 0.58 | 0.26 | 0.1 | 1.2 | <0.01 | <0.01 | <0.001 | <0.001 | 0.42 |
| Ex. 2 | 0.05 | 0.25 | 0.1 | 1.0 | <0.01 | <0.01 | <0.001 | <0.001 | <0.005 |
| Ex. 3 | 0.39 | 0.29 | 0.1 | 1.2 | <0.01 | <0.01 | <0.001 | <0.001 | <0.005 |
| Ex. 4 | 0.40 | 0.05 | 0.1 | 1.2 | <0.01 | <0.01 | <0.001 | <0.001 | <0.005 |
| Ex. 5 | 0.48 | 0.27 | 0.1 | 1.4 | <0.01 | <0.01 | <0.001 | <0.001 | <0.005 |
| Ex. 6 | 0.40 | 0.24 | 0.1 | 0.8 | <0.01 | <0.01 | <0.001 | <0.001 | <0.005 |
| Ex. 7 | 0.40 | 0.25 | 0.3 | 1.3 | <0.01 | <0.01 | <0.001 | <0.001 | <0.005 |
| Ex. 8 | 0.41 | 0.27 | 0.01 | 1.2 | <0.01 | <0.01 | <0.001 | <0.001 | <0.005 |
| Ex. 9 | 0.42 | 0.28 | 0.1 | 1.3 | <0.01 | <0.01 | 0.002 | <0.001 | <0.005 |
| Ex. 10 | 0.40 | 0.26 | 0.1 | 1.2 | <0.01 | <0.01 | 0.05 | <0.001 | <0.005 |
| Ex. 11 | 0.41 | 0.25 | 0.1 | 1.2 | <0.01 | <0.01 | 0.50 | <0.001 | <0.005 |
| Ex. 12 | 0.40 | 0.27 | 0.1 | 1.3 | <0.01 | <0.01 | <0.001 | 0.021 | <0.005 |
| Ex. 13 | 0.42 | 0.25 | 0.1 | 1.3 | <0.01 | <0.01 | <0.001 | <0.001 | 0.005 |
| Ex. 14 | 0.39 | 0.27 | 0.1 | 1.2 | <0.01 | <0.01 | <0.001 | <0.001 | 0.03 |
| Ex. 15 | 0.39 | 0.26 | 0.1 | 1.3 | <0.01 | <0.01 | <0.001 | <0.001 | <0.005 |
| Ex. 16 | 0.40 | 0.27 | 0.1 | 1.2 | <0.01 | <0.01 | <0.001 | <0.001 | <0.005 |
| Ex. 17 | 0.42 | 0.26 | 0.1 | 1.2 | <0.01 | <0.01 | <0.001 | <0.001 | <0.005 |
| Ex. 18 | 0.05 | 0.25 | 0.1 | 1.0 | <0.01 | <0.01 | <0.001 | <0.001 | <0.005 |
| Ex. 19 | 0.40 | 0.05 | 0.1 | 1.2 | <0.01 | <0.01 | <0.001 | <0.001 | <0.005 |
| Ex. 20 | 0.40 | 0.24 | 0.1 | 0.8 | <0.01 | <0.01 | <0.001 | <0.001 | <0.005 |
| Ex. 21 | 0.40 | 0.25 | 0.3 | 1.3 | <0.01 | <0.01 | <0.001 | <0.001 | <0.005 |

TABLE 2

Chemical Composition of Test Materials (Comparative Examples)

| Test | Chemical composition (mass %) | | | | | | | | |
|---|---|---|---|---|---|---|---|---|---|
| | Si | Fe | Cu | Mn | Mg | Zn | Co | Nb | V |
| Comp. Ex. 1 | 0.41 | 0.31 | 0.1 | 1.3 | <0.01 | <0.01 | <0.001 | <0.001 | 0.42 |
| Comp. Ex. 2 | 0.72 | 0.28 | 0.1 | 1.3 | <0.01 | <0.01 | <0.001 | <0.001 | <0.005 |
| Comp. Ex. 3 | 0.42 | 0.51 | 0.1 | 1.2 | <0.01 | <0.01 | <0.001 | <0.001 | <0.005 |
| Comp. Ex. 4 | 0.40 | 0.26 | 0.1 | 1.6 | <0.01 | <0.01 | <0.001 | <0.001 | <0.005 |
| Comp. Ex. 5 | 0.39 | 0.28 | 0.1 | 0.5 | <0.01 | <0.01 | <0.001 | <0.001 | <0.005 |
| Comp. Ex. 6 | 0.41 | 0.26 | 0.5 | 1.3 | <0.01 | <0.01 | <0.001 | <0.001 | <0.005 |
| Comp. Ex. 7 | 0.38 | 0.26 | 0.1 | 1.3 | <0.01 | <0.01 | <0.001 | <0.001 | <0.005 |
| Comp. Ex. 8 | 0.37 | 0.27 | 0.1 | 1.3 | <0.01 | <0.01 | <0.001 | <0.001 | <0.005 |
| Comp. Ex. 9 | 0.72 | 0.28 | 0.1 | 1.3 | <0.01 | <0.01 | <0.001 | <0.001 | <0.005 |
| Comp. Ex. 10 | 0.42 | 0.51 | 0.1 | 1.2 | <0.01 | <0.01 | <0.001 | <0.001 | <0.005 |
| Comp. Ex. 11 | 0.40 | 0.26 | 0.1 | 1.6 | <0.01 | <0.01 | <0.001 | <0.001 | <0.005 |
| Comp. Ex. 12 | 0.41 | 0.26 | 0.5 | 1.3 | <0.01 | <0.01 | <0.001 | <0.001 | <0.005 |

Note)
The underlined values means values outside the ranges prescribed for the elements. For Comparative Examples 7 and 8, see the hot rolling start temperatures of Table 4.

was cold rolled to obtain a thickness 1.0 mm cold rolled sheet. This was designated as the "as-cold-rolled material" (temper code: $H_{12}$). In this case, the final cold rolling reduction was 20% (Example 16) or 10% (Examples 17 to 21 and Comparative Examples 9 to 12).

For the cold rolled, annealed material, first the hot rolled sheet was cold rolled without process annealing so as to obtain a 1 mm cold rolled sheet. In this case, the final cold rolling reduction was 83.3%. The final annealing was performed by inserting the cold rolled sheet into an annealer for annealing at 400° C.×1 hour, then the cold rolled sheet was taken out from the annealer and air cooled. This was designated as the "cold rolled, annealed material" (temper code: O).

Next, the thus obtained final sheet (test material) was evaluated for formability, shape freezability and strength, laser weldability, and heat conductivity.

Evaluation of Shapeability

The obtained final sheet was evaluated for formability by the elongation (%) of a tensile test.

Specifically, a JIS No. 5 test piece was taken so that the tensile direction became parallel with the rolling direction and a tensile test was run based on JIS Z2241 so as to find the 0.2% proof strength and elongation (elongation at break).

In the cold rolled, then annealed final sheet, a test material with a value of elongation of 20% or more was evaluated as having a good formability ("Good") and a test material with a value of less than 20% was evaluated as having a poor formability ("Poor"). The results of evaluation are shown in Tables 3 and 4.

In the as-cold-rolled final sheet, a test material with a value of elongation of 3% or more was evaluated as having a good formability ("Good"), and a test material with a value of less than 3% was evaluated as having a poor formability ("Poor"). The results of evaluation are shown in Tables 3 and 4.

Evaluation of Shape Freezability and Strength

The obtained final sheet was evaluated for shape freezability and strength by the 0.2% proof strength (MPa) of a tensile test.

In the cold rolled, then annealed final sheet (cold rolled, annealed material), a test material with a 0.2% proof strength of 40 to less than 60 MPa was evaluated as having a good shape freezability and strength ("Good"), and a test material with a value of 60 MPa or more was evaluated as having a poor shape freezability ("Poor"). Further, a test material with a 0.2% proof strength of less than 40 MPa was evaluated as having poor strength ("Poor").

In the as-cold-rolled final sheet (as-cold-rolled material), a test material with a 0.2% proof strength of 60 to less than 150 MPa was evaluated as having a good shape freezability and strength ("Good") and a test material with a value of 150 MPa or more was evaluated as having a poor shape freezability ("Poor"). Further, a test material with a 0.2% proof strength of less than 60 MPa was evaluated as having insufficient strength ("Poor"). The results of evaluation are shown in Tables 3 and 4.

Laser Welding Conditions

The obtained final sheet was irradiated by a pulse laser to evaluate the laser weldability. A LUMONICS YAG laser welding machine JK701 was used under conditions of a frequency of 33.0 Hz, a welding rate of 400 mm/min, and energy per pulse of 6.5 J, a pulse width of 1.5 msec, and a shield gas (nitrogen) flow rate of 15 (liter/min) to weld a total 100 mm length by a pulse laser along abutting parts of two sheets of the same test material made to abut without any gap between the end parts.

Evaluation of Laser Weldability

Measurement/Evaluation of Black Spots

Next, as evaluation of laser weldability, the number of weld defects which occurred at the weld zone was measured. First, in the above 100 mm length weld line, the region of 80 mm length remaining after subtracting the 20 mm length weld line at the weld start part was set as the measurement region. The part near the weld start was excluded because it was unstable.

Further, as shown in FIG. 1, the cross-section of the weld bead which was formed along the 80 mm length weld line was scanned by X-ray CT to obtain an X-ray CT image at the cross-section of sheet thickness parallel to the weld line. Furthermore, based on this X-ray CT image, image editing software was used to detect the black spots and image analysis software was used to calculate the area of the black spots. The number of particles which correspond to each circle equivalent diameter was calculated from the area of the black spots.

In the Description, a test material with a number of black spots with a circle equivalent diameter of 0.1 mm or more of less than 5 was evaluated as having a good evaluation of number of weld defects ("Good"), while a test material with a number of black spots with a circle equivalent diameter of 0.1 mm or more of 5 or more was evaluated as having a poor evaluation of number of weld defects ("Poor"). The results of evaluation are shown together in Tables 3 and 4.

Evaluation of Heat Conductivity

Measurement/Evaluation of Electrical Conductivity

The electrical conductivity (IACS %) was measured by a conductivity meter (AUTOSIGMA 2000, made by Japan Hocking). A test material with an electrical conductivity over 45 (IACS %) was evaluated as having good heat conductivity ("Good"), while a test material with an electrical conductivity of 45 (IACS %) or less was evaluated as having a poor heat conductivity ("Poor"). The results of evaluation are shown together in Tables 3 and 4.

TABLE 3

Results of Evaluation of Test Materials (Examples)

| Test material no. | Hot rolling start temp. (° C.) | Tempering (cold rolling reduction) | No. of black penetrators 0.1 mm or more | Tensile characteristics Proof strength MPa | Elongation % | Electrical Conductivity % IACS | Weldability | Strength/ Shape freezability | Formability | Heat conductivity |
|---|---|---|---|---|---|---|---|---|---|---|
| Ex. 1 | 500 | 0 | 3 | 47 | 29 | 49.6 | Good | Good | Good | Good |
| Ex. 2 | 500 | 0 | 0 | 51 | 27 | 45.6 | Good | Good | Good | Good |
| Ex. 3 | 500 | 0 | 2 | 48 | 33 | 45.9 | Good | Good | Good | Good |

TABLE 3-continued

Results of Evaluation of Test Materials (Examples)

| Test material no. | Hot rolling start temp. (° C.) | Tempering (cold rolling reduction) | No. of black penetrators 0.1 mm or more | Tensile characteristics Proof strength MPa | Elongation % | Electrical Conductivity % IACS | Weldability | Strength/ Shape freezability | Formability | Heat conductivity |
|---|---|---|---|---|---|---|---|---|---|---|
| Ex. 4  | 500 | 0          | 1 | 48  | 26 | 45.5 | Good | Good | Good | Good |
| Ex. 5  | 500 | 0          | 2 | 59  | 31 | 45.7 | Good | Good | Good | Good |
| Ex. 6  | 500 | 0          | 1 | 42  | 33 | 50.7 | Good | Good | Good | Good |
| Ex. 7  | 500 | 0          | 2 | 54  | 24 | 46.4 | Good | Good | Good | Good |
| Ex. 8  | 500 | 0          | 1 | 46  | 35 | 47.5 | Good | Good | Good | Good |
| Ex. 9  | 500 | 0          | 0 | 46  | 36 | 47.2 | Good | Good | Good | Good |
| Ex. 10 | 500 | 0          | 1 | 44  | 37 | 47.1 | Good | Good | Good | Good |
| Ex. 11 | 500 | 0          | 4 | 46  | 35 | 46.4 | Good | Good | Good | Good |
| Ex. 12 | 500 | 0          | 0 | 51  | 35 | 47.1 | Good | Good | Good | Good |
| Ex. 13 | 500 | 0          | 0 | 45  | 38 | 47.0 | Good | Good | Good | Good |
| Ex. 14 | 500 | 0          | 1 | 55  | 29 | 46.6 | Good | Good | Good | Good |
| Ex. 15 | 450 | 0          | 1 | 49  | 32 | 46.2 | Good | Good | Good | Good |
| Ex. 16 | 500 | $H_{12}$ (20%) | 1 | 146 | 3  | 45.2 | Good | Good | Good | Good |
| Ex. 17 | 500 | $H_{12}$ (10%) | 1 | 105 | 9  | 45.5 | Good | Good | Good | Good |
| Ex. 18 | 500 | $H_{12}$ (10%) | 0 | 112 | 4  | 45.2 | Good | Good | Good | Good |
| Ex. 19 | 500 | $H_{12}$ (10%) | 2 | 104 | 7  | 45.3 | Good | Good | Good | Good |
| Ex. 20 | 500 | $H_{12}$ (10%) | 1 | 98  | 13 | 50.2 | Good | Good | Good | Good |
| Ex. 21 | 500 | $H_{12}$ (10%) | 1 | 109 | 4  | 46.1 | Good | Good | Good | Good |

TABLE 4

Results of Evaluation of Test Materials (Comparative Examples)

| Test material no. | Hot rolling start temp. (° C.) | Tempering (cold rolling reduction) | No. of black penetrators 0.1 mm or more | Tensile characteristics Proof strength MPa | Elongation % | Electrical Conductivity % IACS | Weldability | Strength/ Shape freezability | Formability | Heat conductivity |
|---|---|---|---|---|---|---|---|---|---|---|
| Comp. Ex. 1  | 500 | 0          | 11 | 55  | 32 | 42.5 | Poor | Good | Good | Poor |
| Comp. Ex. 2  | 500 | 0          | 10 | 46  | 28 | 51.6 | Poor | Good | Good | Good |
| Comp. Ex. 3  | 500 | 0          | 9  | 48  | 32 | 48.2 | Poor | Good | Good | Good |
| Comp. Ex. 4  | 500 | 0          | 7  | 67  | 26 | 43.6 | Poor | Poor | Good | Poor |
| Comp. Ex. 5  | 500 | 0          | 0  | 34  | 39 | 52.2 | Good | Poor | Good | Good |
| Comp. Ex. 6  | 500 | 0          | 3  | 60  | 16 | 43.3 | Good | Poor | Poor | Poor |
| Comp. Ex. 7  | 600 | 0          | 1  | 47  | 35 | 44.1 | Good | Good | Good | Poor |
| Comp. Ex. 8  | 550 | 0          | 2  | 48  | 32 | 44.7 | Good | Good | Good | Poor |
| Comp. Ex. 9  | 500 | $H_{12}$ (10%) | 11 | 104 | 4  | 51.1 | Poor | Good | Good | Good |
| Comp. Ex. 10 | 500 | $H_{12}$ (10%) | 8  | 108 | 7  | 48.0 | Poor | Good | Good | Good |
| Comp. Ex. 11 | 500 | $H_{12}$ (10%) | 9  | 131 | 2  | 43.2 | Poor | Good | Poor | Poor |
| Comp. Ex. 12 | 500 | $H_{12}$ (10%) | 2  | 123 | 3  | 42.8 | Good | Good | Good | Poor |

Evaluation of Test Materials

In Tables 3 and 4 which show the results of evaluation of the final sheets, Examples 1 to 21 are final sheets in the range of composition of the present invention (cold rolled, annealed materials and as-cold-rolled materials). The starting temperature for the hot rolling was 500° C. or 450° C., and the evaluation of laser weldability (black spots), evaluation of shape freezability and strength (0.2% proof strength), evaluation of formability (elongation), and evaluation of heat conductivity (electrical conductivity) were all good ("Good").

Further, Examples 9 to 14, compared with Example 3, contain almost the same contents of Si, Fe, Cu, Mn, etc., yet despite that contain predetermined amounts of Co, Nb, or V, so the electrical conductivity rose to 0.5 to 1.3% IACS in range. In particular, Examples 9 to 13, compared with Example 3, contain predetermined amounts of Co, Nb, and V, so become higher in value of elongation.

Comparative Example 1 is a cold rolled, annealed material where the Fe content is a high 0.31 mass % and, further, the V content is a too high 0.42, so the weldability was evaluated as poor ("Poor") and the heat conductivity was evaluated as poor ("Poor").

Comparative Example 2 is a cold rolled, annealed material where the Si content is a high 0.72 mass %, so the weldability was evaluated as poor ("Poor").

Comparative Example 3 is a cold rolled, annealed material where the Fe content is a too high 0.51 mass %, so the weldability was evaluated as poor ("Poor").

Comparative Example 4 is a cold rolled, annealed material where the Mn content is a too high 1.6 mass %, so the weldability was evaluated as poor ("Poor"), the shape freezability was evaluated as poor ("Poor"), and the heat conductivity was evaluated as poor ("Poor").

Comparative Example 5 is a cold rolled, annealed material where the Mn content is a too low 0.5 mass %, so the strength was evaluated as poor ("Poor").

Comparative Example 6 is a cold rolled, annealed material where the Cu content is a too high 0.5 mass %, so the shape freezability was evaluated as poor ("Poor"), the formability was evaluated as poor ("Poor"), and the heat conductivity was evaluated as poor ("Poor").

Comparative Example 7 is a cold rolled, annealed material in the range of composition of the present invention but the starting temperature for the hot rolling is a too high 600° C., so the heat conductivity was evaluated as poor ("Poor").

Comparative Example 8 is a cold rolled, annealed material in the range of composition of the present invention but the starting temperature for the hot rolling is a too high 550° C., so the heat conductivity was evaluated as poor ("Poor").

Comparative Example 9 is an as-cold-rolled material where the Si content is a high 0.72 mass %, so the weldability was evaluated as poor ("Poor").

Comparative Example 10 is a as-cold-rolled material where the Fe content is a too high 0.51 mass %, so the weldability was evaluated as poor ("Poor").

Comparative Example 11 is an as-cold-rolled material where the Mn content is a too high 1.6 mass %, so the weldability was evaluated as poor ("Poor"), the formability was evaluated as poor ("Poor"), and the heat conductivity was evaluated as poor ("Poor").

Comparative Example 12 is an as-cold-rolled material where the Cu content is a too high 0.5 mass %, so the heat conductivity was evaluated as poor ("Poor").

In this way, according to the present invention, there is provided 3000 series aluminum alloy sheet which has a heat dissipation characteristic which enables application to a large-size lithium ion battery container and which further is excellent in both formability and shape freezability and also excellent in laser weldability.

We claim:

1. An aluminum alloy sheet for battery container use which is excellent in formability, heat dissipation, and weldability consisting of a cold rolled, annealed material which consists of Fe: 0.05 to less than 0.3 mass %, Mn: 0.6 to 1.5 mass %, Si: 0.05 to 0.6 mass %, and one or more of Co: 0.001 to 0.5 mass %, and Nb: 0.005 to 0.05 mass %, has a balance of Al and impurities, has, as impurities, Cu: less than 0.35 mass % and Mg: less than 0.05 mass % in chemical composition, has an electrical conductivity of over 45% IACS, has a 0.2% proof strength of 40 to less than 60 MPa, and has a 20% or more value of elongation.

2. An aluminum alloy sheet for battery container use which is excellent in formability, heat dissipation, and weldability consisting of an as-cold-rolled material which consists of Fe: 0.05 to less than 0.3 mass %, Mn: 0.6 to 1.5 mass %, Si: 0.05 to 0.6 mass %, and one or more of Co: 0.001 to 0.5 mass %, and Nb: 0.005 to 0.05 mass %, has a balance of Al and impurities, has, as impurities, Cu: less than 0.35 mass %, Mg: less than 0.05 mass % in chemical composition, has an electrical conductivity of over 45% IACS, has a 0.2% proof strength of 60 to less than 150 MPa, and has a 3% or more value of elongation.

* * * * *